United States Patent

[11] 3,588,506

[72] Inventors Derek J. Kyte
177, Valley Road, Chorleywood, Hertfordshire;
David J. Stewart, 52, Oakland Drive, Wokingham, Berkshire, England

[21] Appl. No. 654,172
[22] Filed July 18, 1967
[45] Patented June 28, 1971
[32] Priority July 20, 1966
[33] England
[31] 32664/66

[54] PHOTOELECTRIC SCANNING AND IMAGE-MODIFYING EQUIPMENT
10 Claims, 7 Drawing Figs.

[52] U.S. Cl. 250/83.3, 250/219, 250/226, 355/39
[51] Int. Cl. G01t 1/16
[50] Field of Search 250/219 (I), 237, 226, 83.3 (IR); 355/39X

[56] References Cited
UNITED STATES PATENTS
3,372,383 3/1968 Konen et al. 250/219

*Primary Examiner*—James W. Lawrence
*Assistant Examiner*—Martin Abramson
*Attorney*—Darbo, Robertson and Vandenburgh

ABSTRACT: Electro-optical image reproducing equipment in which electrical signals produced by photoelectric scanning of an original, after modification in tone or color correcting circuits, are used to control the brightness of a light beam, said light beam being responsible for the exposure of a light sensitive layer to produce an image representative of some tonal or color function of the original, for example, to the production of an image from a plurality of originals. There is a simultaneous photoelectric scanning of a color or monochrome transparency together with a superimposed mask, the mask having comparatively low density in its image areas to visible light but comparatively high density to infrared radiation to which the color transparency has comparatively low densities.

Inventors:
Derek John Kyte and
David John Stewart
By: Davis, Robertson & Vandenburgh,
attys Inventors:
Derek John Kyle and
David John Stewart
By: Darbo, Robertson & Vandenburgh,
Attys Inventors:
Derek John Kyte and
David John Stewart
By: Darby, Robertson & Vandenburgh.
Attys

PHOTOELECTRIC SCANNING AND IMAGE-MODIFYING EQUIPMENT

BACKGROUND AND SUMMARY OF THE INVENTION

In a typical equipment of the present type, the original may take the form of a color transparency and may be held on the surface of a rotating glass cylinder. From within the cylinder, a narrow light beam is projected through the transparency and thence into a photoelectric scanning system. Here the light beam may be split into a plurality of components, which, after passing through different filters, fall on a plurality of photocells. The electrical signals from the photocells are fed to electrical circuits where various tonal and color corrections take place. The output or outputs from such circuits control the brightness of one or more glow modulator tubes, the light from each of which is focused on the surface of a light sensitive layer carried on a rotating cylinder. The cylinder or cylinders carrying the light sensitive layers normally rotate in synchronism with the cylinder carrying the original transparency and at the same time the scanning and exposing light sources are made to move slowly in a direction parallel to the axes of the cylinders. In this way, the original is scanned line by line in spiral fashion while at the same time one or more images representative of the original are exposed line by line on the light sensitive layers. The resultant images are made up of many adjacent scanning lines, but if these are narrow enough, the images appear to be "continuous tone" to the human eye. The exact nature of the photoelectric image reproducing equipment is immaterial to the present invention, providing, the images are exposed line by line by a variable source of light. The continuous tone or screened images produced by such equipments are frequently used for the production of monochrome or color printing forms. In many such cases, it is desired that the final printed image is a composite produced from more than one original. A common example would be an advertisement consisting of a colored picture of a holiday resort with the same of the resort written across it in large white letters.

The originals for such a picture are likely to consist of a colored transparency of the resort and a separate monochrome transparency of the required lettering. If positive color separation from the transparency were to be produced on an electro-optical equipment of the kind described above, it would be possible to produce the desired composite images by overlaying the unexpressed films with prepared positive masks representing the required lettering, (i.e. masks in which the lettering is substantially opaque and the background substantially transparent). Where composite negative color-separations are required, the best way would be produce positive separations as outlined above and to copy these by contact, or in a camera, to produce negatives.

Such methods can become much more complicated when one considers other types of composite image. For example, if light green lettering was required in the above example at least two masks and two extra photographic or scanning operations would be necessary.

A method of utilizing an electro-optical scanner to produce composite images has been disclosed in which two completely separate scanning systems are provided. The color or monochrome transparency is scanned with one system while an image of the lettering is simultaneously scanned with the other. By suitable electronic means, the electrical signals from the two scanning systems can be combined to produce composite separations in which the lettering is of any required density (i.e. any desired color in the final print.

However, the addition of a separate scanning system is complex and costly, especially as both scanning systems have to operate in exact synchronism.

A simpler method is known which does not involve the use of any additional mechanical or optical systems. In this method, a high density positive mask of the required lettering is superimposed over the color transparency and the two scanned together. It is a requirement of this method that the optical transmission density of the positive mask in the exposed area should be substantially greater than the highest density expected on the color transparency. Since few color transparencies have transmission densities much greater than about 3.0 a suitable density for the positive mask would be 4.0. Electronic circuits can be devised which respond only to the very low scanning signals obtained when the scanning light spot passes over regions of density 4.0 or greater. Such circuits can be used in the fashion of a "trigger" to disconnect the scanning signals from the exposing light source (e.g. glow modulator tube) and to connect in their place a fixed signal of predetermined strength. In this way, composite images can be exposed in which the lettering appears with any required density, unrelated to the density of the mark.

This method suffers from two serious disadvantages. The first is illustrated in the accompanying FIGS. 1A, 1B, and may be understood by considering the form of the electrical signal from one of the photocells in the scanning system while the light spot is passing over a region of the high density lettering. FIG. 1A represents a light (i.e. low density) region of the color transparency across which a band of the lettering image passes. FIG. 1B shows the photoelectric signal corresponding to the traversal of light spot across the image from left to right. The ordinates of FIG. 1B are marked in transmission densities from 0 to 4. Because the scanning light spot must have a finite size, a certain time has to elapse before the photoelectric signal can change from its maximum value in the clear region of the color transparency to a very low value in the region of superimposed lettering. This time, which is dependent on the spot diameter and the scanning speed, is represented by the horizontal distance AB in FIG. 1B. Now if the trigger circuits referred to above are adjusted to operate at density 4 and above, it is clear that they will start to operate at the time represented by the vertical at B. Should the trigger circuit be adjusted to produce a transparent or clear image on the composite positive separation, then this clear image cannot appear until time B. Meanwhile, however, the photoelectric signal has dropped to a very low level and the reproducing light spot will have increased in intensity accordingly. Thus on the exposed positive separation, the region of the lettering will be clear will be clear but will be surrounded by a dark halo. This halo will not be so noticeable where the lettering stands against a dark part of the color transparency but it will still be present to some degree.

The second objection to this method is that it does not work satisfactorily for superimposed images which contain very fine details. The reason for this is that the optical system which is invariably used between the illuminated area of the transparency and the photocells can never be perfect. As a result, the contract of the fine details as seen by the photocells is inevitably less than on the original transparency/mask combination. In particular, if a fine line of density 4.0 is being scanned, it is probable that light scatter will reduce its effective scanned density to appreciably less than this FIG. (Even 0.1 percent scattered light will reduce density 4.0 to less than 3.0). Thus the trigger system will not respond at all under these conditions. The amount of scattered light which will degrade the image contrast will generally depend on the density of the region of the color transparency over which stands the fine mask details. Thus fine lines which just operate the trigger circuits when against a dark background may be missed altogether when against a light background. For similar reasons, not so fine lines will appear thicker or thinner on the composite image according to the density of the background, i.e. of the color transparency in that region.

For the above reasons, the high density superimposed mask method is not suitable for most requirements, at any rate where high quality images are required.

It is the purpose of the present invention to provide means for producing composite images on photoelectric reproducing equipment, in which a separate scanning field is not required and with which high quality images can be reproduced without difficulty. The invention consists basically in the simultaneous photoelectric scanning of a color or monochrome transparency together with a superimposed mask, such mask having comparatively low density in its image areas to visible light but comparatively high density in its image areas to visible light but comparatively high density to infrared radiation to which the color transparency has comparatively low densities. Apart from the photocell or photocells which yield electrical signal corresponding to the transmittance of the composite image in the variable region, an additional photocell is utilized which has its sensitivity substantially only in the region of wavelengths where the transmittance of the color transparency is high and that of the superimposed mask low. The electrical signal from this additional photocell is utilized to control electrical circuits which are capable of switching off or modifying the visible photoelectric signals according to some predetermined program.

It will be apparent that this system does not suffer from the two main defects of the high density superimposed mask method. Because the mask does not have considerable density in the visible wavelength regions, the visible light photoelectric signals will not fall drastically as the light spot traverses the edge of the mask image. Thus there will either be no halo, or an insignificant one, around the lettering etc. on the final composite image. Secondly, because the mask image is of comparatively low density, scattered light will not appreciably alter the contrast of scanned details (0.1 percent scattered light will change a scanned density of 1.0 to 0.99). Moreover, since the color transparency has little density in the near infrared region of mask absorption, the amount of light scattered will not depend very much on the density of the color transparency beneath fine mask details.

The preferred form of the invention will now be described with reference to the attached drawings in which:

In addition to FIGS. 1A, 1B discussed above,

Figure 2:
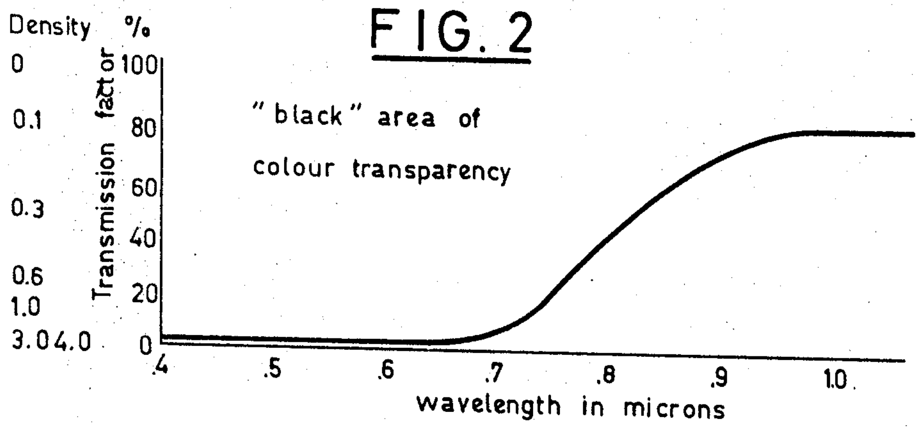
FIG. 2 shows the approximate spectral transmittance of a typical color transparency in the densest areas.

The spectral curve of FIG. 2 shows the relative transmittance of the densest (i.e. unexposed areas of a typical color transparency after full processing. This transparency appears black to the human eye and has an optical density in the visible part of the spectrum (0.4 to 0.7 microns) of around 3.0. It will be seen that in the near infrared (around 1.0 microns), the density in much lower and is typically about 0.10 to 0.30.

If a mask containing an exposed image with comparatively high density at around 1 micron is now superimposed on the transparency, the density of the latter will have comparatively little effect on the density of the combination at or near a wavelength of 1 micron. If, in addition, the mask has comparatively low density in the visible part of the spectrum (0.4—0.7 microns), then the density of the combination in the visible range will be largely determined by the visible density of the color transparency i.e. the mask has little effect on the combined density within the visible range.

Figure 1A:
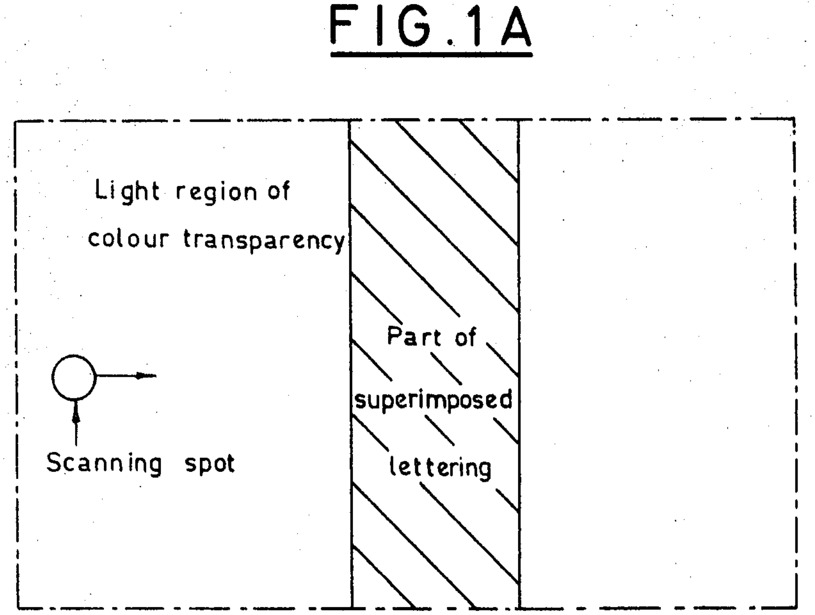
Figure 1B:
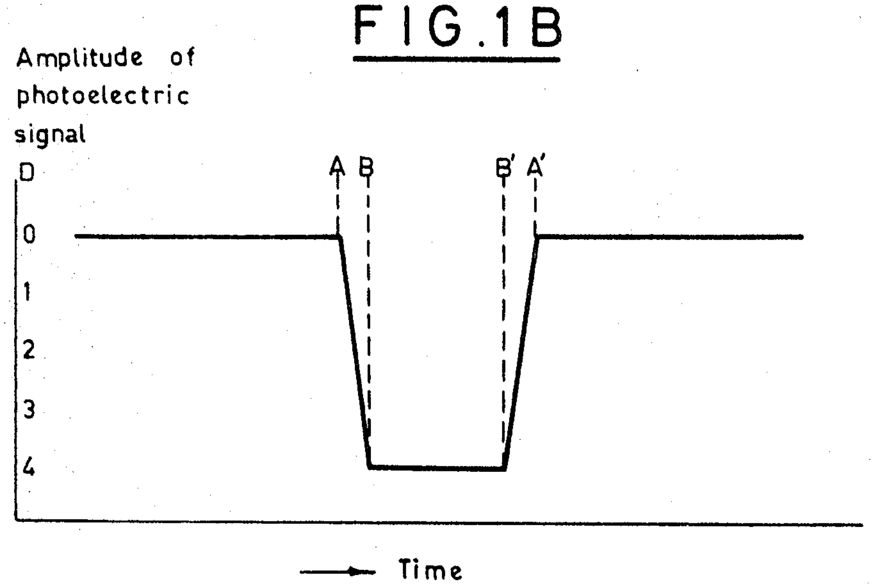

Theoretically, an invisible mask would be ideal but in practice it is usually desirable that a faint visible image of the lettering is available. This helps in positioning the mask on the transparency. Such a visible image is preferably yellow in color so that if it produces any "halo" effect on the color separations, as discussed earlier in connection with FIG. 1, then the halo will be predominantly or only visible on the yellow separation. In the printed result, it will then be least apparent to the human eye.

The optical density to visible radiation of a mask image of invariable density should be no greater than, and the optical densities of a mask image of variable density should be in a range the upper end of which is not greater than, the lower end of the range of optical densities of the picture transparency to visible radiation.

There are many possible ways of making a mask which fulfills the above requirements. One method which has been found successful is described below.

A well defined silver image of the required lettering or other matter is produced by normal methods on ordinary photographic film. It is desirable that the fog level in the unexposed portions is kept as low as possible. The exposed image should have a density of around 1.0. After processing and washing, the film is immersed and agitated in a chemical bath for approximately 6 minutes at a temperature of 68° F. The composition of the bath is 10 gms. of potassium Ferricyanide, 5 gms. of Ferric Ammonium Citrate, 125 gms. Sodium citrate, 10 gms. Ammonium Chloride, 71.5 ccs. Hydrochloric Acid (S.G.1.16), 15 gms. of Vanadium Chloride in the form of Merck's 50 percent solution, to which is added 1 litre of water.

The action of this bath is to convert the silver in the image into silver ferrocyanide and at the same time to deposit insoluble vanadium ferrocyanide onto the image areas. Finally, the silver salts are removed by immersion in a sodium thiosulfate solution (hypo) and the film washed and dried.

Figure 3:
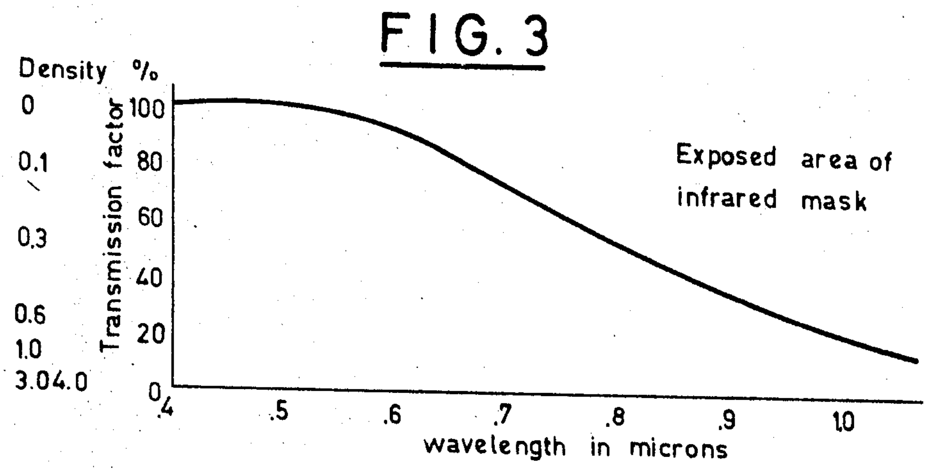
FIG. 3 shows the approximate spectral transmittance of one form of dyed image mask.

The resultant image is well defined and corresponds closely to the original silver distribution. It has a low degree of optical scatter and appears a pale yellow-green to the human eye. Its density in the region 1—0.2 microns is of the order of 1.0-—1.3. The general form of the spectral transmission curve is shown in FIG. 3.

It will be apparent that if such a mask is combined with a color transparency, the presence of the image on the mask will have comparatively little effect on the signals from the photocells which are responsive to light in the visible regions. If a photocell scanning system sensitive substantially only in the region of wavelengths around 1 micron is used, then the photoelectric signal from this photocell will be about 10 times lower in amplitude when scanning the mask image than when scanning any part—even the "blackest"—of the color transparency.

Figure 4:
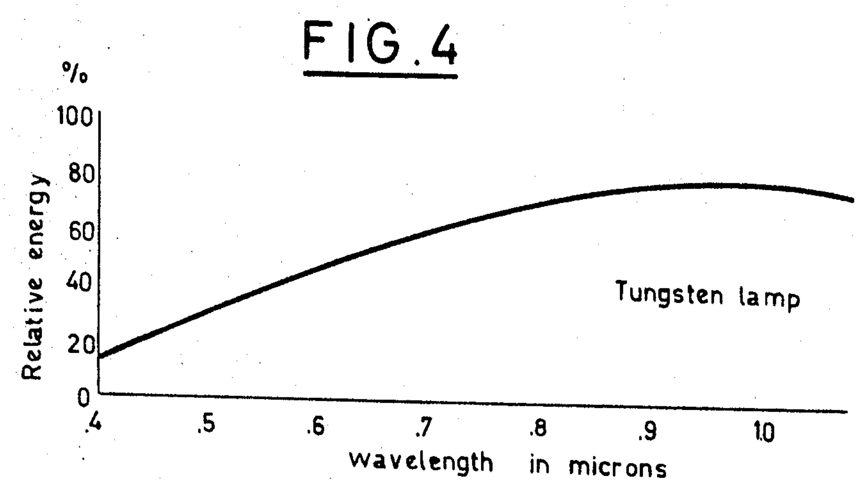
FIG. 4 shows the approximate spectral energy distribution in the radiation from a tungsten lamp.

For such a photoelectric signal to be obtained, a scanning light source having a reasonable proportion of radiation in the near infrared is necessary. A tungsten lamp is ideal for this purpose. The spectral energy distribution from a typical small tungsten lamp is shown in FIG. 4. Secondly, a photocell having sensitivity in the band of wavelengths around 1 micron is required. Many such cells are available. A typical one has a silver-oxygen-bismuth photocathode (the so-called "S1" type).

Figure 5:
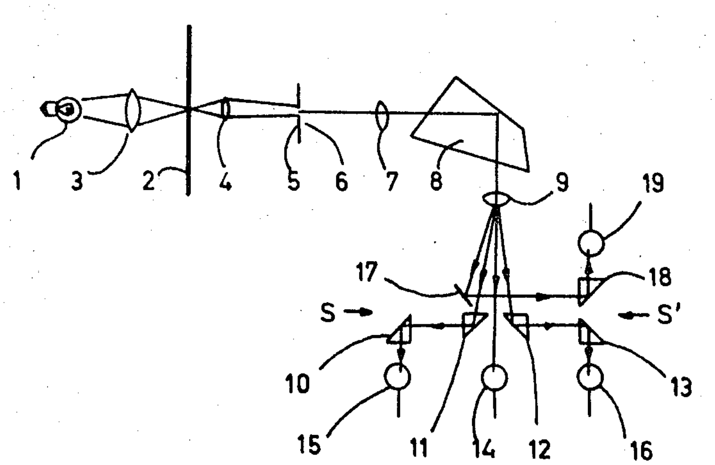
FIG. 5 shows one type of scanning system suitable for the operation of the invention.

Again, many ways are available for splitting up the scanning beam into visible and infrared bands of wavelengths. One method which has been found very satisfactory is illustrated diagrammatically in FIG. 5. Light from a small tungsten lamp is focused onto a combined color transparency and mask 2 by a condensing lens 3. The emergent light is collected by the lens 4, which produces an image of the illuminated area of the transparency/mask combination in the plane 5. In this plane is placed an opaque plate 6 having a small hole (aperture) at its center which passes light corresponding only to a very small element of the transparency. The light emerging from the aperture is collimated by lens 7 and split into a spectrum by the prism 8. An image of the spectrum is formed by lens 9 in the plane 5, 5'. The right angled prisms 10, 11, 12 and 13 are so disposed that the green part of the visible spectrum passes between prisms 11 and 12 and falls onto photocell 14. The red part of the visible spectrum is reflected by prisms 11 and 10 into the photocell 15 while the blue part is reflected by prisms 12 and 13 into photocell 16. A plane mirror 17 intercepts the infrared region of the spectrum and reflects radiation via prism 18 into an infrared sensitive photocell 19. Nonreflecting masking plates (not shown) are placed over the surface of the mirror 17 to define the region of the infrared spectrum required.

Figure 6:
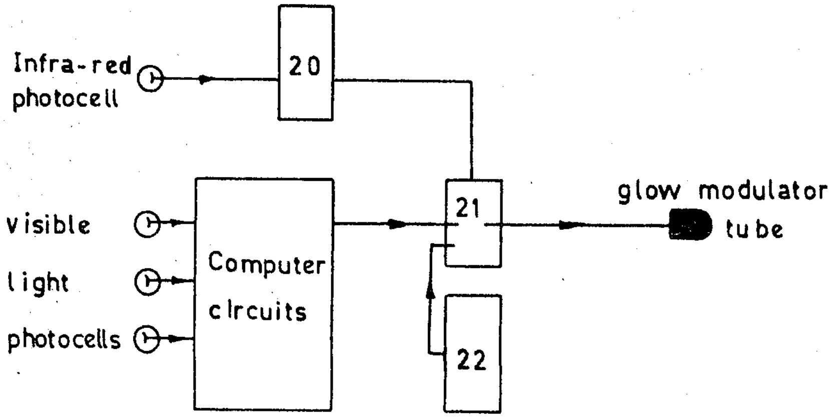
FIG. 6 shows a diagram of circuits for utilizing the invention to produce one kind of composite image.

The system described can be used in a variety of ways, depending on what type of composite image is required. One example is that referred to earlier, where it is required to produce one or more positive color separations from a color transparency, each of which has to contain an image of lettering. This lettering does not, of course, form part of the original transparency. Suppose that the lettering is required to print full red in the final color reproduction. If four color printing is being considered, this means that the lettering must appear as a very low density on the cyan and black positive color separations, and a high density of the yellow and magenta separations. The first step is to produce an infrared absorbing mask of the kind described above, the exposed and dyed areas corresponding to the required lettering. This mask is then fixed over the color transparency and the combination mounted in the scanning equipment. The signals from the photocell or cells responsible for scanning in the visible region are fed to some form of computer where the functions of color corrections, undercolor removal, tonal correction etc., are carried out in ways well known in the art. The output or outputs of such circuits are normally fed to the glow modulator tube or tubes responsible for exposing the color separations. Where composite image separations are to be produced, additional circuits have to be interposed somewhere in the computer. FIG. 6 shows in block diagram form one suitable arrangement. The output of the infrared sensitive photocell is fed (via suitable amplifiers if necessary) to a trigger circuit 20 which is adjusted to respond when the input signal falls below a certain amplitude. When using a mask of the type described, this amplitude will be about 15 percent of the signal obtained from clear film. When the trigger circuit 20 operates it in turn operates an electronic switching circuit 21 whose function is to remove the connection between the computer output signal and the glow lamp and to connect in its place a fixed signal of some predetermined value generated by circuit 22.

If the above example of red lettering is being considered, then circuit 22 could be adjusted to give a low level output when the cyan and black separations were being scanned and a high level output during the scanning of the yellow and magenta separations. The electronic switching circuit 21 along with the signal generator 22 forms a signal modifying device and the trigger circuit 20 forms an electrical control device.

During the scanning, the corrected color separations would be exposed normally by the glow modulator tube until the scanning spot arrived at the edge of an exposed area of the infrared mask. At this point, the trigger circuit would be operated and the glow modulator tube would be fed with a constant signal, determined by the adjustment of circuit 22. When the light spot passed off the exposed mask area, the glow tube would be reconnected to the normal picture signal.

The electrical circuits 20, 21 and 22 are of kinds well known in the art and their exact nature does not form part of this invention. The electronic switching circuit 21 along with the signal generator 22 forms a signal modifying device and the trigger circuit 20 forms an electrical control device.

Many other uses of the infrared mask method will be apparent. For example, the presence of an exposed and treated area on the mask may be used to alter the operation of the computer rather than to switch off the picture signal.

Thus the reproduced separation could have areas, defined by the mask image, which are lighter or darker or have different color treatment from the rest of the picture. Another possibility is the scanning of two color transparencies side by side around or along the scanning drum in one operation, the transparencies being sufficiently different from one another to require different computer adjustments for optimum reproductions. One of these transparencies could be completely covered with a sheet of exposed infrared photocell used to operate control circuits which change the computer adjustments. In the above cases, it is generally preferable for the exposed mask area to be invisible or nearly so. With transparencies side by side around the drum, each circumferential scan will scan them in turn, the computer adjustment being changed each half rev. A further use of the infrared mask is in combining areas of two different color transparencies to form one composite picture. Thus for example supposing that one has a color transparency of a girl standing in a street, and another transparency of a field in the country. It is desired to produce a composite picture of the girl standing in the field. An infrared mask is prepared when the exposed region is exactly the same shape as represented by the outline dimensions of the girl. This mask is superimposed on the transparency of the field, and the combination scanned. In this case, the sensing of the exposed mask area is utilized to switch off the glow lamp completely so that unexposed areas are left in the color separations. Without removing these partly exposed films, the fluid transparency is removed and the girl transparency substituted, the inframask remaining in place. A second scanning is now made but this time the sensing of the infrared image is made to switch on the connection between the computer and the glow lamp, this connection being broken completely when the infrared image is not being scanned. In this way, the image of the girl is exposed in the blank spaces left on the color separations during the previous scanning.

We claim:

1. In the method of photoelectric reproduction wherein an image is superposed on a layout appearing on a a transparency and wherein a beam of visible light is scanned across the transparency and the transmitted light from the transparency is used to produce electric signal indicative of the visible light transmitting properties of the transparency, the improvement comprising:

preparing a mask bearing said image such that the image area of the mask has relatively high density to infrared radiation as compared to the transparency, and has relatively low density to visible light;

positioning said mask so that the scanning beam also traverses the mask;

including infrared light in said beam;

picking up the infrared light of the beam after it traverses the mask and transparency and generating electrical signals from the changes in the infrared part of the beam indicative of when the beam scans the image; and using the electrical signal from the infrared part to modify the character of the electrical signals indicative of the visible light transmitting properties.

2. In the method of claim 1, wherein the electrical signal from the infrared part are used to turn off the signals from the visible light transmitting properties.

3. In the method of claim 2, wherein the signals from the infrared part are utilized to instigate the propagation of third electrical signals.

4. In the method of claim 2, wherein the transparency has a range of optical density to visible light the lower end of which range is approximately a given amount, and said mask has a maximum density to visible radiation which is no greater than said given amount.

5. In the method of claim 1, wherein the electrical signal indicative of the visible light transmitting properties are modified in accordance with an adjustable program.

6. In the method of claim 1, wherein the transparency has variable density produced by dyes and the density of the mask is produced by insoluble vanadium cyanide.

7. In the method of claim 1, wherein the scanning beam is derived from a tungsten lamp.

8. In the method of claim 1, wherein the infrared part of the beam is directed to a photoelectric cell having a silver-oxygen-bismuth photocathode to produce said electrical signals from the infrared part.

9. In an apparatus for photoelectric reproduction wherein an image is superposed on a layout appearing on a transparency and wherein a beam of visible light is scanned across the transparency and the transmitted light from the transparency is used to produce electrical signals indicative of the visible light transmitting properties of the transparency, the improvement comprising:

a mask bearing said image such that the image area has relatively high density to infrared reaction as compared to the transparency, and relatively low density to visible light, said mask being positioned in conjunction with the transparency so that the scanning beam traverses both the transparency and mask:

said beam including infrared light as well as visible light;

first means for picking up the infrared light of the beam after it traverses the mask and transparency and generating electrical signals from the changes in the infrared part of the beam indicative of when the beam scans the image; and second means for using the electrical signals form the infrared part to modify the character of the electrical signals indicative of the visible light transmitting properties.

10. In an apparatus as set forth in claim 9, wherein said first means comprises:

first photocell means for producing electrical signals when visible light is received thereby;

second photocell means for producing electrical signals when infrared light is received thereby;

spectrum splitting means for dividing the infrared components from the visible light part of the beam received by the first means, said splitting means directing the visible light part of the beam to the first photocell means and the infrared component to the second photocell means;

an electrical control device connected to the second photocell means for producing control signals in response to the electrical signals from the second photocell means; and said second means comprises an electrical signal modifying means connected to said first photocell means and to said control device for producing output signals corresponding to said electrical signals from the first photocell means modified in accordance with said control signals.

UNITED STATES PATENT OFFICE

CERTIFICATE OF CORRECTION

Patent No. 3,588,506 Dated June 28, 1971

Inventor(s) Derek J. Kyte and David J. Stewart

It is certified that error appears in the above-identified patent and that said Letters Patent are hereby corrected as shown below:

Col. 1, line 11, After "different" insert - colored -.

Col. 1, line 37, "same" should be - name -.

Col. 1, line 45, "unexpressed" should be-unexposed-.

Col. 1, line 46, "prepared" should be - preprepared -.

Col. 2, line 14, "mark" should be - mask -.

Col. 2, line 51, "contract" should be - contrast -.

Col. 3, line 43, Before "diagram" insert - block -.

Col. 3, line 51, "in" should be - is -.

Col. 5, lines 41-44 Delete "The electronic switching circuit 21 along with the signal generator 22 forms a signal modifying device and the trigger circuit 20 forms an electrical control device".

Col. 5, lines 56-58 " " " " "

Col. 4, line 54, After "lamp" insert - 1 -.

Col. 6, line 16, "fluid" should be - field -.

Signed and sealed this 21st day of March 1972.

(SEAL)
Attest:

EDWARD M.FLETCHER,JR.
Attesting Officer

ROBERT GOTTSCHALK
Commissioner of Patents